Oct. 19, 1926.　　　　　　　　　　　　　　　　　1,603,917
J. G. JOHNSTON
GYPSUM TILE MACHINE
Filed June 23, 1924　　　4 Sheets-Sheet 1
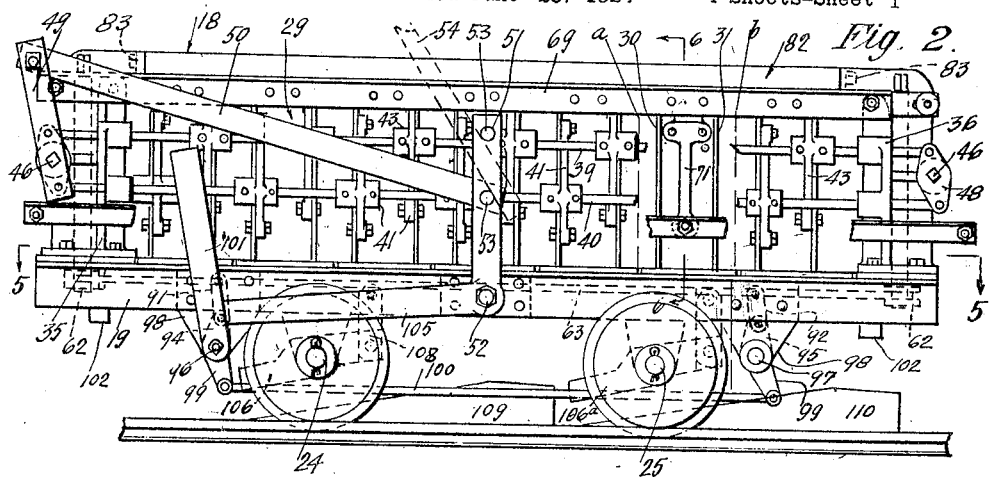
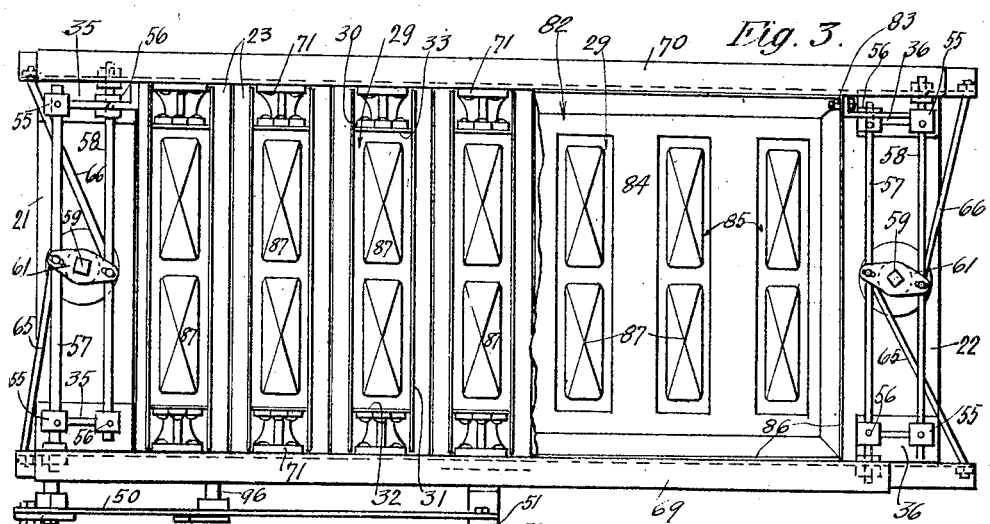
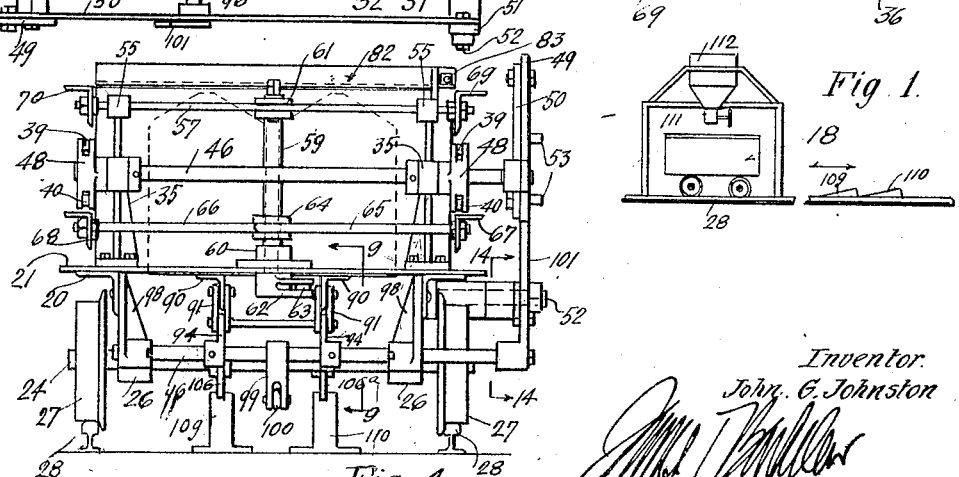
Inventor.
John G. Johnston
Attorney.

Oct. 19, 1926.  
J. G. JOHNSTON  
GYPSUM TILE MACHINE  
Filed June 23, 1924   4 Sheets-Sheet 2

1,603,917

Inventor  
John G Johnston  
Attorney.

Oct. 19, 1926.　　　　　　　　　　　　　　　　　　　1,603,917
J. G. JOHNSTON
GYPSUM TILE MACHINE
Filed June 23, 1924　　　4 Sheets-Sheet 3
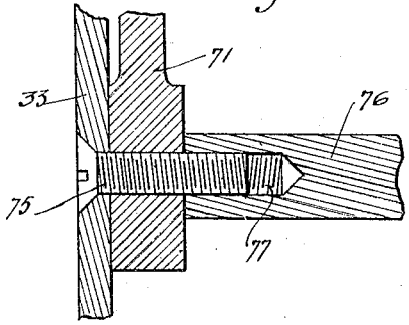
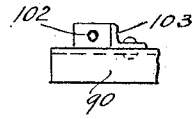
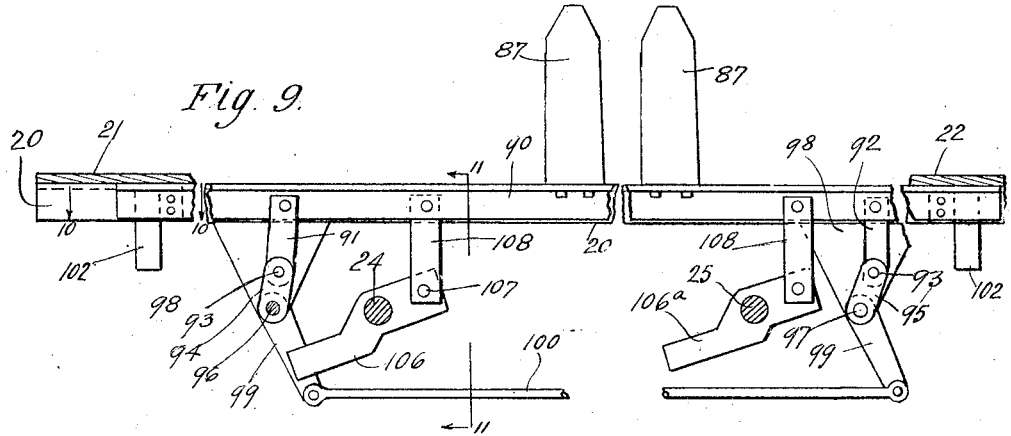
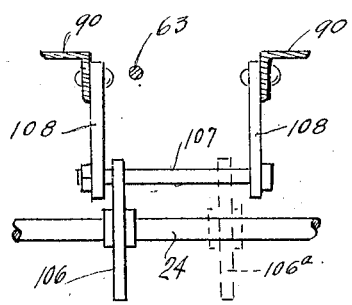
Inventor.
John. G. Johnston.
Attorney.

Oct. 19, 1926.
J. G. JOHNSTON
1,603,917
GYPSUM TILE MACHINE
Filed June 23, 1924    4 Sheets-Sheet 4
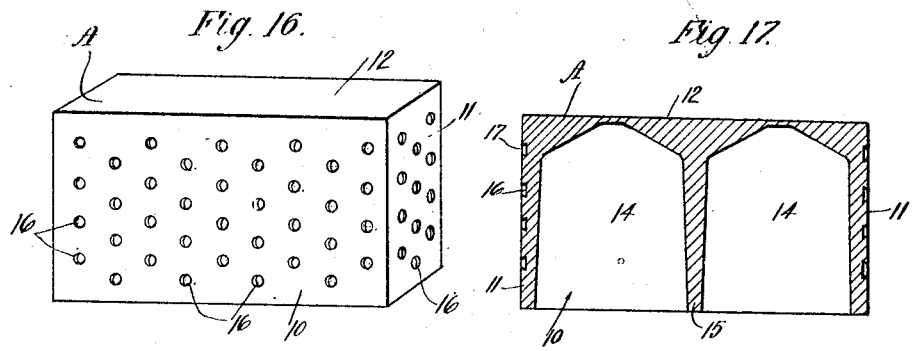
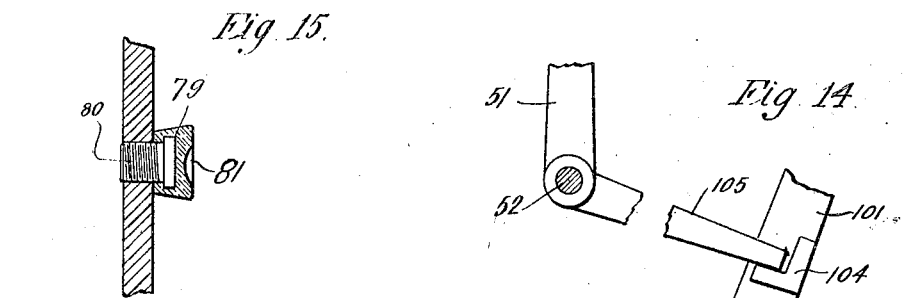
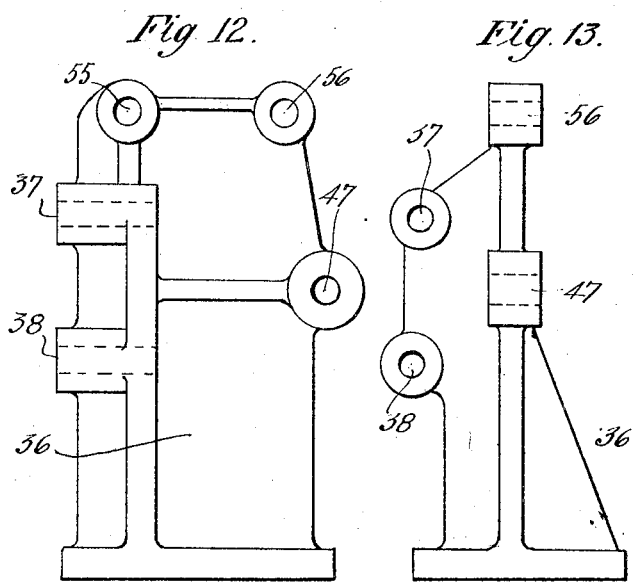
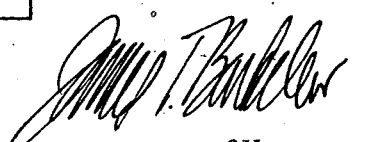

Patented Oct. 19, 1926.

1,603,917

UNITED STATES PATENT OFFICE.

JOHN G. JOHNSTON, OF LOS ANGELES, CALIFORNIA, ASSIGNOR TO PACIFIC GYPSUM TILE COMPANY, A CORPORATION.

GYPSUM-TILE MACHINE.

Application filed June 23, 1924. Serial No. 721,744.

This invention has to do generally with molding machines and is more particularly concerned with machines for molding gypsum tile and the like, such as are used in the construction of fireproof partitions and walls.

I will describe the invention as embodied in a machine designed for producing hollow tile of the type set forth in my co-pending application for United States Letters Patent on building blocks and wall construction, filed December 19, 1923, Serial No. 681,496; but this description of a particular embodiment is not to be construed as in any way indicating that the invention is limited to this specific application for the machine may be utilized for molding blocks of any suitable plastic substance such as concrete or clay, and, by making changes of a minor nature, it is adapted to turn out solid tile or blocks of exterior configuration other than that illustrated in said co-pending application.

It is necessary that the mold plates be stripped from the sides of the formed block before the plastic substance has taken its final set (the final set usually taking place within a dry kiln where all sides of the block must be exposed) and it has been found of extreme difficulty to perform this stripping operation without tearing away portions of the unset substance, breaking away the corners or defacing the sides of the block to such an extent as will render them unserviceable, or at best, unsightly. Therefore, it is among the objects of my invention to provide a molding machine which will admit of "stripping" without damaging the block in any way.

I also provide means whereby the mold plates may be moved positively and easily to and from operative positions (that is, to and from positions which place the molds in condition to receive a charge of material) and since a battery of molds is preferably provided in connection with each machine, I inter-connect the mold plates of the various units so they may be moved simultaneously, with little effort, and with speed.

To form the facial depressions provided in the tile under particular consideration, I provide the inner faces of the mold plates with resilient conical core buttons arranged with their bases out so the plastic material, as it enters the mold, flows around the buttons in a manner to leave the depression mouths of restricted diameter, whereby, during wall construction, mortar spread on the abutting faces of adjacent blocks enters the depressions and forms dove-tail key connection therewith. Due to the compressible characteristics of the buttons, their enlarged heads may be withdrawn through the restricted mouths of the facial depressions during mold stripping operation without tearing the over-hanging mouth defining walls.

I also provide means for loosening the cell forming cores from the tile, so said tile may be easily lifted free of the mold for transfer to kiln cars. This is an especially important feature in connection with the manufacture of hollow tile having their medial cells closed off with a top wall. In such cases, the cores are entirely surrounded by gypsum except at their lower ends, and considerable effort must be exerted to break the vacuum caused by drawing the tile and core apart after the gypsum has taken its initial set. However, I have arranged means for moving the cores without calling for undue effort on the part of the operator, and without chipping or breaking away the walls of the semi-plastic tile.

Other objects and features of the invention may be pointed out to better advantage in the following description, reference being had to the accompanying drawings, in which:

Fig. 1 is a diagrammatic side elevation of my machine in position to receive a charge of plastic material;

Fig. 2 is a side elevation of the machine, certain parts being broken away to more fully disclose underlying parts;

Fig. 3 is a top plan view of the machine, the cover plate or tray being broken away from the left side of the view to expose the mechanism therebeneath;

Fig. 4 is an end elevation of the machine as viewed from the left of Fig. 2;

Fig. 8 is a sectional detail illustrating a preferred type of joint between an adjustment stud, end plate, and end plate supporting member;

Fig. 9 is a contracted, fragmentary section, on line 9—9 of Fig. 4;

Fig. 10 is a horizontal section on line 10—10 of Fig. 9;

Fig. 11 is a vertical section on line 11—11 of Fig. 9, showing the core trip mechanism, but omitting all mechanism therebeneath;

Fig. 12 is an enlarged detached elevation of the main bracket shown at the right of Fig. 2;

Fig. 13 is an elevation of the bracket as viewed from the right of Fig. 12;

Fig. 14 is an enlarged, fragmentary section on line 14—14 of Fig. 4;

Fig. 15 is an enlarged section on line 15—15 of Fig. 7, showing a button or core for forming recesses in the sides of the finished tile;

Fig. 16 is a perspective view of a tile such as the illustrated machine is designed to turn out, but is not to be considered as indicating that the invention is limited in its application to a machine for turning out only tile of the illustrated configuration; and Fig. 17 is a longitudinal, medial section through a tile of the configuration illustrated in Fig. 16.

Figure 5:
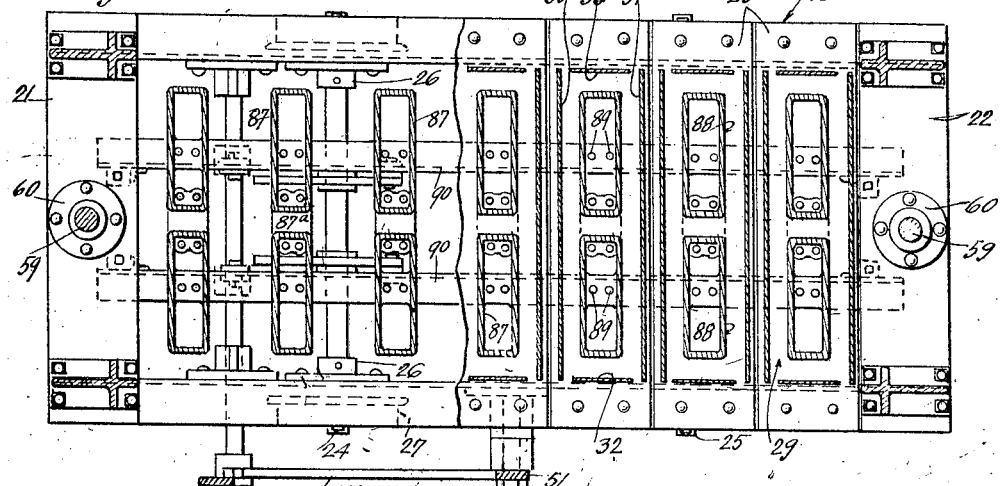
Fig. 5 is a horizontal section on line 5—5 of Fig. 2; but showing the mold plates moved out of operative position.

Before proceeding to a detailed description of the machine, I wish to make certain general remarks and reservations.

While it is obviously of economic advantage to provide a battery of molds in a single machine and to provide mechanism for simultaneously shifting the plates of the several moulds into and out of operative position, the general principles of construction and operation may be applied to a single mold; that is, the invention does not lie alone in the provision of inter-connecting means between the several mold units of a battery machine.

Again, I have illustrated the machine as being mounted on a track guided truck, so it may be moved to bring the several molds successively beneath the material distributing spout and then moved clear of the material mixer and distributer for the stripping and tile removal operation. However, it obviously lies within the scope of certain of my claims to provide a stationary machine and convey the plastic material in buckets, or the like, to the machine, or to swing a movable distributor over the several molds so they may all be charged from a stationary mixer.

In certain of the drawings, notably Fig. 2, the scale is necessarily so small that I have broken away certain parts in order to more fully disclose underlying elements. Thus, in Fig. 2, although each end plate of the mold is provided with a supporting member attached at top and bottom to angle irons, the showing of these end plate supports would merely confuse the showing of the side plate actuating mechanism. Therefore, I have omitted these end plate supports, except between the broken lines $a$, $b$; and between these lines I have omitted all side plate supporting and actuating mechanism. For the same reason, the angle iron connecting the bottom ends of all end plate supports is shown only fragmentarily.

I will first describe the type of tile which the illustrated machine is designed to turn out, it being borne in mind that the invention, in its broader aspects, is readily applicable to machines for the manufacture of tile of different conformation.

Referring to Figs. 16 and 17, the rectangular hollow tile A has side walls 10, end walls 11, and top wall 12. This construction leaves interior air spaces or cells 14, separated by vertically extending partition 15, opening only at the lower face of the tile. The side and end walls are provided with facial depressions 16 which are preferably of closed contour in contra-distinction to channels which might extend from top to bottom of the walls. The closed contour characteristics of the depressions preclude the withdrawal of the mold plate (which support the depression forming cores) in any direction but perpendicularly to the side or end walls of the tile. In other words, the mold plates and tile may not have relative vertical movement until the depression forming cores have been moved out of engagement with the tile. This point will be more apparent after the hereinafter detailed discussion of the mold plates and their depression forming cores, but has been mentioned above to clearly set out the necessity of moving the mold plates horizontally before the tile may be removed from the mold.

The mouths 17 of the depressions are restricted with respect to the inside diameter of the depression bores. This gives a conical or dove-tail outline to the recesses, as viewed in axial cross-section, and forms sockets for receiving mortar spread between adjacent tile in wall construction. The mortar thus entering the sockets fills the recesses or depression, and when set, forms outwardly flaring or in effect, headed studs or protuberances) for mechanically interlocking the tile and mortar.

Figure 7:
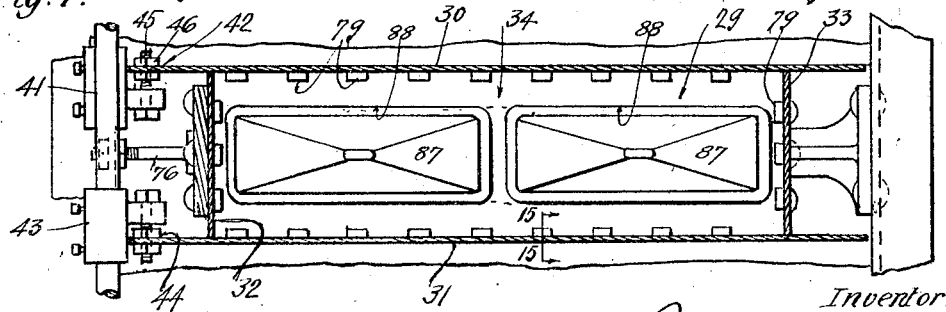
Fig. 7 is a horizontal section on broken line 7—7 of Fig. 6.

In Fig. 2, I have shown a truck 18, comprising angle iron sills 19 and 20 joined by end bed plates 21 and 22; intermediate bed plates or mold bases 23; and axles 24, 25, which are journaled in sill supported hangers 26, the axles carrying wheels 27 whereby the truck may be guided from point to point over track 28. Truck 18 carries a plurality of molds 29 but since all these molds may be of identical construction, I need describe but one in detail. The mold walls are made up of vertical side plates 30 and 31, and end plates 32 and 33, all of these plates being so mounted that their lower edges closely approach, or, preferably, bear on and are movable over an associated mold base plate 23, the latter serving to define the bottom edge of the tile to be molded. The side plates are movable towards and away from each other, as are also the end plates, and the side plates preferably over-lap the end plates when the mold is contracted, as shown in Figs. 2 and 7. When the side and end plates are at their limit of approaching or inward movement, they, with their associated base plates, define a chamber 34 of rectangular outline, the dimensions of the chamber being the same as the over-all dimensions of the block or tile to be molded. When moved to occupy this relative position, the plates may be considered as in operative position, and the mold may be considered as "contracted." When the plates are moved away from each other, as indicated in Fig. 5, they may be considered as out of operative position, and the mold, proper, may be considered as "expanded."

Now, let us consider the mountings of the plates and the mechanism whereby they are moved to and from operative position, it being understood that they are moved from operative position to strip them from the exterior of the partially set tile.

Bed plates 21 and 22 each carry a pair of brackets (see Figs. 12 and 13 for details thereof) those on plate 21 being indicated at 35 and those on plate 22 being indicated at 36. Each bracket has a pair of vertically spaced bearings 37, 38, through which extend slide rods 39 and 40. These rods extend longitudinally of the truck, that, is, from one bracket 35 to a companion bracket 36. A supporting member 41 is fixed on rod 40 and is adjustably secured to the inner side of plate 30 at 42, while supporting member 43 is fixed on rod 39 and is adjustably secured to the inner side of plate 31 at 44. The adjustable connection between each plate and its supporting member is in the form of a threaded stud 45, fixed to the support and passing through the associated plate, nuts 46 serving to lock the plate in adjustment. Obviously, by adjustment of connections 42 and 44, the horizontal distance between side plates may be varied for the purpose of varying the width of the mold chamber or for bringing the side plates into proper association with their end plates when the mold is contracted.

Considering all the side plates of the machine, it will be noted that alternate plates are attached to a given slide rod, and consequently, that opposite longitudinal movement of the two rods causes the opposite side plates of each mold to move towards or away from each other and it will be noted that the plates remain erect and parallel during such movement. I employ the following mechanism for thus moving the plates into or out of operative position. A transverse rock shaft 46 is arranged at each end of the machine, the shaft being journaled within bearings 47 on brackets 35 and 36. Cranks 48 are secured near the extremities of each rock shaft and the opposite and equi-length crank arms are attached, with suitable lost motion connections, to rods 39 and 40. The ends of the shaft may be squared or otherwise mutilated to receive a wrenching tool whereby the shaft may be rocked to cause horizontal reciprocation of the slide rods.

I find, however, that with the arrangement just described, it is sometimes difficult to secure sufficient leverage to enable the operator to easily reciprocate the rods, especially in view of the fact that the depression forming cores (to be described) which I employ on the side plates, and which are embedded in the sides of the tile, offer considerable resistance to separative movement between the plates and tile. Therefore, I prefer to compound the leverage in the manner shown in Fig. 2. A crank arm 49 is secured to one rock-shaft 48, and link 50 connects this arm to lever 51, the latter being pivotally mounted on the sill-carried stub shaft 52. Lever 51 carries horizontally projecting pins 53 whereby a crow-bar 54, or the like, may be inserted between the pins in the manner illustrated in dotted lines in Fig. 2, and used to swing lever 51. The swing of lever 51 and its associated mechanism causes reciprocation of rods 39 and 40 and brings about a consequent movement of side-plates 30, 31 into or out of operative position.

I will now describe the mounting and actuation of end plates 32, 33. At the upper extremity of each bracket 35, 36, are the bearings 55, 56, each axially alined pair of which support slide rods 57, 58. Rock shafts 59 extend through bed plates 21 and 22, being journaled in bearings 60 and extending vertically midway between slide rods 57, 58. Cranks 61 are fast on the rock shaft, and the crank arms have suitable lost motion connection with the slide rods, so oscillation of the shaft (accomplished for instance, by the application of a suitable wrenching tool to the squared or mutilated shaft ends) imparts reciprocatory movement to the slide rods. At the lower ends of shaft 59 are cranks 62 (Figs. 2 and 4) which are connected by reach rod 63, so oscillation of one vertical shaft causes coincident oscillation of the other.

Intermediate the plates 20, 21 and cranks 61, are the shaft carried cranks 64, similar to cranks 61. The opposite extremities of cranks 64 are connected by links 65 and 66 to lower side rails 67 and 68, respectively (see Figs. 2 and 4).

Slide rods 57 and 58 are fixed to the opposite extremities of upper side rails 69 and 70, respectively, and these rails (preferably, they are angle irons) overlie and substantially parallel sills 19 and 20. Supporting member 71 (Figs. 2, 6 and 8) are secured to rails 69 and 70 at 72, and the offset legs 73 of said members are secured to end plates 32 and 33 at 74. By reason of the offsets, side plates 30, 31 may extend beyond end plates 32, 33 to allow for the attachment of support members 41 to the sides of plates 30, 31, while rails 69, 70 are spaced horizontally a sufficiently greater distance than are end plates 32, 33, to bring about certain desired relative positions between said rails and associated mechanism.

Figure 6:
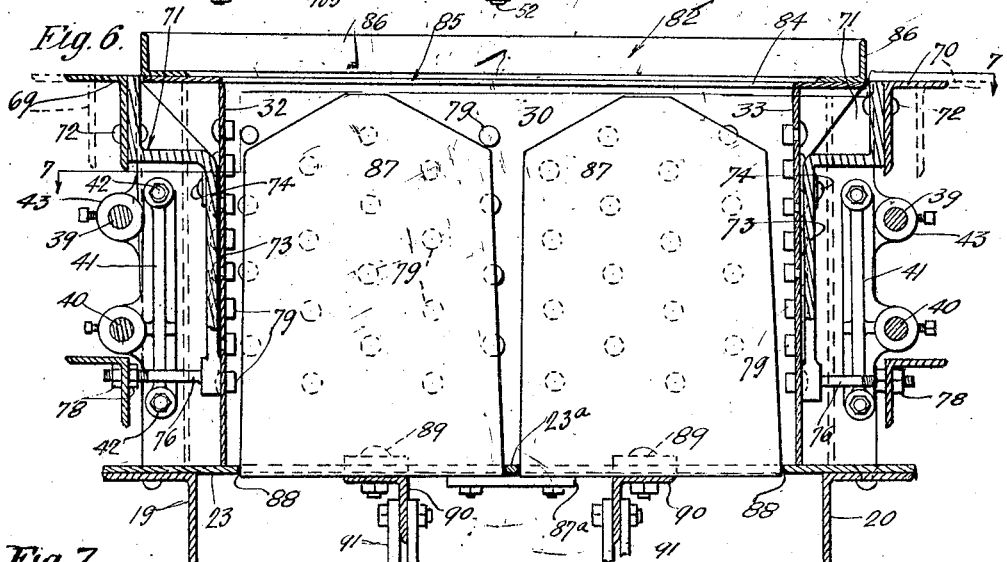
Fig. 6 is an enlarged vertical section on the broken line 6—6 of Fig. 2.

Preferably, lower side rails 67 and 68 are adjustably attached to end plates 32, 33, and support member 71 in the manner illustrated in Figs. 6 and 8. Flat head screws 75 extend through the end plates from the inside of the mold, the screw heads resting in counter-sinks so their tops are flush with the plates, and the screw shanks are threaded through and project beyond member 71. One end of each stud 76 has an internally threaded bore 77 for receiving the projecting end of given screw 75, while the opposite end of the stud is externally threaded and extends through one of the lower side rails. Nuts 78 are threaded on studs 76 at opposite sides of rail 67 or 68 and serve as means for adjusting and locking the lower ends of the mold plates 32, 33 in adjustment. Thus, by proper manipulation of nuts 78, the end plates may be shifted to vary the length of the mold compartment somewhat, or to bring said plates into parallelism should they become somewhat displaced.

It is evident that reciprocation of slide rods 57 and 58 (during a given crank movement they will, of course, move horizontally in opposite directions due to the central arrangement of shaft 59) causes rails 67 and 69 to move horizontally towards or away from rails 68 and 70, respectively, and move end plates 32, 33 inwardly towards or outwardly away from the mold center. The end plates remain erect and parallel during their movement. Thus, counterclockwise movement of either shaft 59 (as viewed in Fig. 3) moves the end plates away from each other and out of operative position (see Fig. 5) while subsequent opposite rotation of the shaft will draw said plates back to operative position. By reason of the two point application of force on each end plate, strains are distributed thereover, and the plates are moved to and fro with ease and are pulled evenly from the molded tile rather than becoming canted as they are withdrawn.

The inner faces of the mold plates are studded with core buttons 79 (see Figs. 6, 7 and 15). These buttons are for the purpose of forming facial depressions in the finished tile, as described above. They are made of resilient, compressible material such as rubber, and are molded about studs 80 which are threaded into suitable apertures in the mold plates. Preferably, the buttons are in the form of truncated cones or are preferably of frusto-conical outline, their lower bases facing outwardly from and their upper bases contacting with the mold plates. In order to increase their yield ability to compressive forces, the lower bases of the buttons may be recessed at 81, as clearly shown in Fig. 15.

Assuming that the mold plates are in operative position, when gypsum in a plastic state is admitted to mold chamber 34 it flows around core buttons 79, leaving hollows in the sides of the gypsum body, these hollows or depressions being of dove-tail, axial cross-section, or in other words, complementary in outline to buttons 79. Then, after the gypsum is partially set and when the mold is expanded, the buttons are radially compressed as they pass out through the restricted mouths of said depressions, the buttons yielding inwardly rather than tearing away the overhanging lips of said mouths. As soon as the buttons are entirely clear of the gypsum body they return to normal shape due to the inherent resilient qualities thereof.

Now referring to Figs. 2, 3 and 6, I have illustrated a tray 82 hinged at 83 to brackets 35 and 36 so the bottom plate 84 of said tray may be lowered onto or lifted clear of the molds. Plate 84 serves as a cover plate for the machine and has apertures 85 which register with chambers 34 when the tray is lowered over the contracted molds, and said plate has a marginal, upturned flange 86 (preferably formed by riveting an outlining angle iron to the top of plate 84.) With the molds and tray in operative position, plastic gypsum may be poured over the tray anywhere within the limit established by flange 86, and then spread so it runs into compartments 34 and fills the molds. It will be noted by reference to Fig. 3 that flange 86 is horizontally spaced from the top edges of the mold plates when the latter are in operative position. The cover plate keeps the gypsum from dropping between molds, and forms a gage plate for establishing the height of the finished tile, since the gypsum, after it has partially set, is scraped off flush with the top face of said plate, the horizontal spacing of flange 86 making this scraping operation one of easy accomplishment.

I will now discuss the cell cores and their actuating mechanism, referring particularly to Figs. 6, 9, 10, 11 and 14. In order to provide the previously described cellular construction, I arrange two horizontally spaced, hollow cores 87 in each compartment 34. These cores are adapted to project downwardly through apertures 88 in base plates 23, the cores resting on and being secured at 89 to vertically movable angle iron sills 90 which extend longitudinally beneath base plates 23 and in substantial parallelism with the truck sills. Sills 90 may be considered as making up a core supporting frame. The two cores occupying each chamber 34 may be tied together by plate 87ª (Figs. 5 and 6) which is located below bar 23ª of said plate 23, said bar forming the partition between the core accommodating apertures 88.

The opposite extremities of sills 90 are connected to the truck by links 91, 92. These links have pivotal connection at 93 with cranks 94 and 95 respectively, said cranks being fixed to transverse shafts 96 and 97 journaled in hangers 98, the latter depending from truck sills 19, 20. Shafts 96 and 97 also carry fixed crank arms 99, said arms being connected by link or reach-rod 100.

At the end of shaft 96 is an actuating lever 101 whereby the shaft may be rocked, the crank and link connection 99, 100 causing coincident oscillation of shaft 97. It is obvious that clockwise rotation of shaft 96 (as viewed in Fig. 9) swings cranks 94, 95 in the same direction and allows gravitation of or exerts a downward pull on sills 90 and their associated cores 87. Subsequent counter-clockwise movement of shafts 96, 97 and cranks 94, 95, lifts the sills in a manner to return the cores to operative position, the contact of plates 87ª with partition bars 23ª positively establishing the limit of upward movement of the cores.

In order that sills 90 may not have longitudinal movement during their ascension and descension, I secure depending stop blocks 102 to the lower faces of bed plates 21 and 22, and sills 90 carry angle iron stops 103 which have sliding engagement with opposed sides of blocks 102 during sill movement.

I may provide various means for releasably locking the cores in operative or raised position. As a preferred type of lock, I arrange an angle iron stop 104 on the inner face of actuating lever 101, (see Fig. 14) and a lock bar 105, either pivotally and independently mounted on stub shaft 52 or made as an integral extension of lever 51. Assume that bar 105 be loose on shaft 52. When the cores are in operative position, lever 101 occupies such a position that bar 105 may be swung into engagement with stop 104, the horizontal leg of said stop preventing the bar from dropping, and the end of the bar engaging the vertical leg of said stop to prevent counterclockwise movement of lever 101 and shaft 96, as viewed in Fig. 14, or clockwise movement thereof as viewed in Figs. 2 and 9. By the prevention of such shaft movement, cranks 94, 95 and links 91, 92 are held stationary and prevent gravitation of the sills and cores, it being understood that when said sills are at the limit of their upward movement the pivotal connections between sills, cranks, links and shafts are so relatively located that the sills may not gravitate by forcing counterclockwise movement of cranks 94, 95, as viewed in Fig. 9.

By making bar 105 integral with lever 51, I may provide an interlock between the side plate actuating mechanism and core moving mechanism. In such a situation, shaft 96 may not be rocked to lower the cores until lever 51 has been rotated sufficiently to lift bar 105 clear of stop 104, thus compelling separative movement between the mold side plates 30, 31 before the cores 87 may be lowered.

Since it requires considerable effort to start the cores away from the tile, it being obvious that vacuum created between them during their separation must be broken, I have provided automatic means for starting the cores. As will be seen, I take advantage of the very considerable weight of the tile filled mold car to accomplish this end.

Pivoted on axles 24 and 25, respectively, are the trip fingers or levers 106 and 106ª, which are pivotally connected to cross bars 107, the latter being suspended from sills 90 by links 108. The fingers, as viewed from the ends of the truck, are out of alinement, and are adapted to simultaneously engage inclined ramp rails 109 and 110 (these ramp rails being positioned between the track rails 28, one of the ramps being in vertical alinement with one finger, and the other ramp being in vertical alinement with the other finger when the truck is moved thereover). The fingers, in riding over their respective ramps, are swung in a clockwise direction, (as viewed in Fig. 9, and assuming, of course, that lock bar 105 has previously been moved upwardly from engagement with stop 104) thus exerting a downward pull on links 108 and moving the cores clear of the newly formed tile. The cores are subsequently reset in operative position by proper actuation of lever 101.

Now assume the mold car is in the condition of Fig. 1, that is, the mold plates, cores and tray are in operative position, and the chambers 34 ready to receive a charge of gypsum. Truck 18 is run beneath the distributing spout 111 which leads from the elevated gypsum mixer 112. The plastic gypsum is allowed to flow into tray 82, whence it spreads and flows to and fills chambers 34, the car preferably being moved to bring an empty chamber beneath spout 111 as a given chamber becomes full (rather than delivering all the gypsum at one point along tray 82 and spreading it the length of the car by means of a trowel or the like). The operator admits sufficient gypsum to insure a complete filling of all molds, and then pushes the car along track 28, clearing the way for an empty mold car. After the gypsum has partially set, the surplus material is scraped from off plate 84. Tray 82 is then swung upwardly and back on hinges 83, and the side and end plates of the mold are stripped from the tile as previously described. Cores 87 serve to hold the tile against displacement during this stripping operation, for they prevent said tile from adhering to and moving with any one plate.

Lock bar 105 is then disengaged from stop 104, and the car pushes over ramps 109 and 110 (or lever 101 is manually rotated) to pull the cores away from the tile. Thereupon the operator lifts the tile out of compartments 34 and places them on a kiln truck. The empty mold car is now cleansed, the inner faces of the mold plates are lubricated to prevent adhesion of gypsum, the entire mold placed in operative condition, and the car returned to a position beneath spout 111 ready for a new charge.

It will be understood that while I have shown and described a preferred embodiment of my invention, various changes in structure, arrangement and design may be made without departing from the spirit and scope of the invention. Therefore, I do not wish to be limited to the particular embodiment shown and described, except for such limitations as a fair interpretation of the appended claims may impart.

Having described a preferred form of my invention, I claim:

1. In a molding machine, a plurality of movable vertically arranged mold plates adapted, when in operative position, to define the sides of a mold chamber, means for moving the mold plates into and out of operative position, and a cover plate hingedly movable to and from a position over said mold plates and having apertures adapted to register with said mold chamber when the mold plates are in operative position.

2. In a molding machine, a plurality of movable, vertically arranged mold plates adapted, when in operative position, to define the sides of a mold chamber, means for moving the mold plates into and out of operative position, and a tray movable to and from a position over said mold plates, the bottom of the tray having apertures adapted to register with said mold chamber when the mold plates are in operative position, and the sides of the tray being horizontally spaced from the mold plates when said plates are in operative position.

3. In a molding machine, a supporting frame, slide rods supported by the frame, mold plates, adjustable connections between the rods and plates, and means for sliding the rods in a manner to move said plates with respect to the supporting frame.

4. In a molding machine, a supporting frame, a pair of slide rods supported by the frame, a pair of oppositely disposed mold plates, one of the mold plates being connected to one of the rods and the other mold plate being connected to the other rod, and means for reciprocating the rods to change the relative positions of the plates.

5. In a molding machine, a supporting frame, a pair of slide rods supported by the frame, a pair of oppositely disposed mold plates, one of the mold plates being connected to one of the rods and the other mold plate being connected to the other rod, and means for simultaneously reciprocating the rods in opposite directions whereby the mold plates are simultaneously moved toward and away from each other.

6. The combination of a truck adapted to be rolled over a predetermined path, a plurality of plates on the truck adapted to define a mold chamber, a movable core supported by the frame and adapted to be moved into and out of operative position within the chamber, core moving mechanism on the truck, and means arranged in the path of the truck and adapted to coact with said mechanism in a manner to operate it when the truck is moved therepast.

7. The combination of a truck adapted to be rolled over a predetermined path, a mold element on the truck and movable into and out of operative position, element moving mechanism on the truck, and means arranged in the path of the truck and adapted to coact with said mechanism in a manner to operate it when the truck is moved therepast.

8. The combination of a truck adapted to be rolled over a predetermined path, a plurality of plates on the truck adapted to define a mold chamber, a movable core supported by the frame and adapted to be moved into and out of operative position within the chamber, core moving mechanism on the truck, and a ramp rail positioned in the path of said truck and adapted to coact with said mechanism in a manner to operate it when the truck is rolled thereover.

9. In a molding machine, a supporting frame, a plurality of mold plates supported by the frame and movable into and out of operative position, means for moving the plates, a core supported by the frame and movable into and out of operative position between the plates, means for moving the core, and releasable means interlocked with the plate moving means for locking the core in operative position.

10. In a molding machine, a mold plate, and a compressible core secured to the plate, said core being in the form of a truncated cone arranged base out.

11. In a molding machine, a mold plate, a core secured to the plate and having an enlarged head projecting from the side of said plate, said head being compressible and resilient and having a recess in its ends.

12. In a molding machine, a supporting frame, a pair of slide rods supported by the frame, a pair of oppositely disposed mold plates, one of the mold plates being connected to one of the rods and the other mold plate being connected to the other rod, and means for reciprocating the rods to change the relative positions of the plates; said means including a rock shaft journaled on the frame, and a crank on the shank and having a pair of arms extending oppositely therefrom, and connected near their free ends, one to each rod.

13. In a molding machine, a supporting frame, a pair of slide rods supported by the frame, a pair of oppositely disposed mold plates, one of the mold plates being connected to one of the rods and the other mold plate being connected to the other rod, and means for reciprocating the rods to change the relative positions of the plates; said means including a rock shaft journaled on the frame, a crank on the shaft and having a pair of arms extending oppositely therefrom and connected near their free ends, one to each rod, and a crank and link mechanism for rocking the shaft.

14. The combination of a relatively movable truck adapted to be rolled over a predetermined path, a mold element on the truck and movable into and out of operative position, element moving mechanism on the truck, and relatively stationary means arranged to be traversed by the truck in its movement over said path and adapted to coact with said mechanism in a manner to operate it when the truck is moved therepast.

In witness that I claim the foregoing I have hereunto subscribed my name this 27th day of May, 1924.

JOHN G. JOHNSTON.